United States Patent Office 3,286,940
Patented Nov. 22, 1966

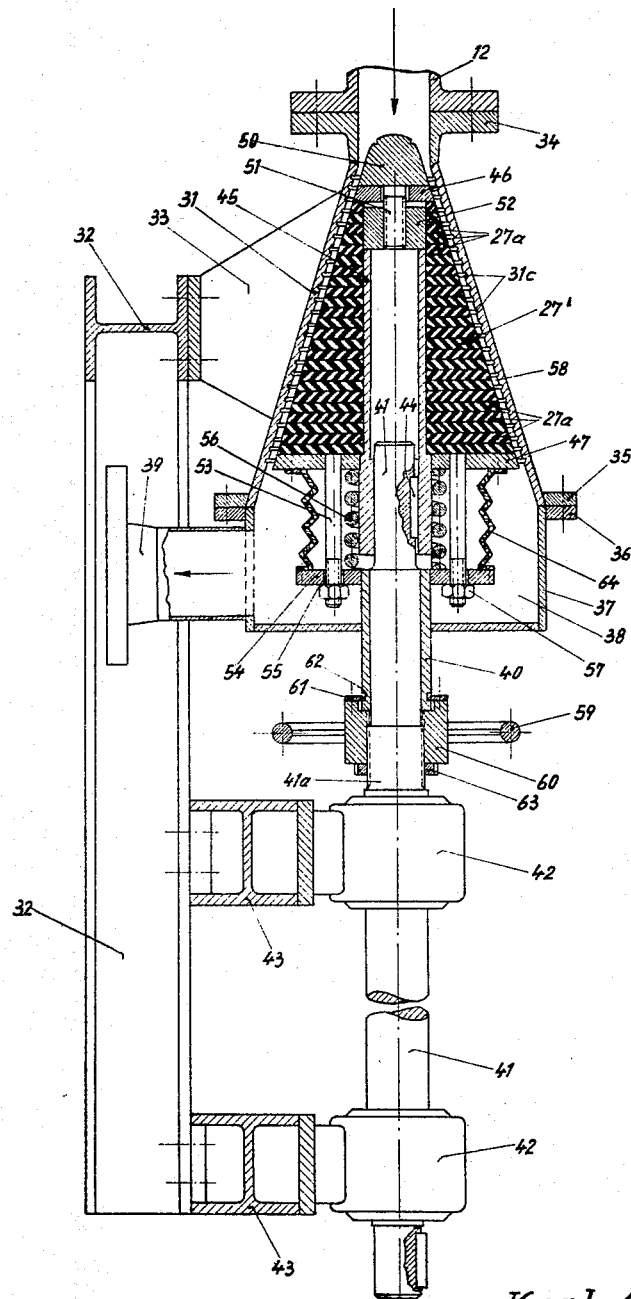

3,286,940
APPARATUS FOR DRESSING CRUDE ASBESTOS
Karl Adolf Oesterheld, Luthe, near Wunstorf,
Hannover, Germany
Original application July 18, 1961, Ser. No. 124,923, now Patent No. 3,170,834, dated Feb. 23, 1965. Divided and this application Sept. 9, 1964, Ser. No. 413,665
Claims priority, application Germany, July 20, 1960, O 7,532; May 10, 1961, O 8,052; May 15, 1961, O 8,060
3 Claims. (Cl. 241—259)

This is a division of application Serial No. 124,923, filed July 18, 1961 and now Patent No. 3,170,834, issued February 23, 1965.

Asbestos is a raw material occurring at relatively few places throughout the world and its quality differs considerably according to the district where it is to be found. The main factor which determines the quality was hitherto the natural length of the fibres bundler together in the raw state. The price of long-fibred asbestos material is many times that paid for short-fibred asbestos material.

For producing articles from asbestos cement, namely pipes, plates and moulded bodies which must have the strength factors laid down by international standards (ISO 7077), one was hitherto dependent upon long-fibred asbestos material; short-fibred asbestos material, such as for example material known internationally under the designation 6 and 7, can only be used as filling material if it is added in not too large quantities by weight to high-grade long asbestos fibres.

The dressing of crude asbestos, the individual fibres of which hang together in bundles, was hitherto carried out in pug mills, beater mills, hollow mills, centrifugal mills, so-called disintegrators. Although the asbestos material is subject to robust treatment in the known dressing apparatus, whereby the fibres are destroyed and shortened to a great extent, it is not possible to open up the fibre bundles to such an extent that the fibres are even approximately separated from each other. If the treated crude asbestos and the products made therefrom are carefully examined it will be found that the asbestos fibres still hang together in bundles. This fact, which considerably impairs the strength and unformity of the structure of the asbestos cement product, is due to insufficient dressing of the crude asbestos material.

In view of the above-mentioned knowledge, the technical problem arises of finding a way of dressing the asbestos material in a more satisfactory manner. It was not possible to carry out the dressing with more vigorously acting means than those hitherto used for the conventional method of dressing, because this would subject the asbestos fibres to still greater danger of being damaged and destroyed than was the case with methods of dressing hitherto employed.

In developing this inventive idea the entire quantity of cement required for making the asbestos cement finished products can be added to the fibre-liquid mixture already before the treatment of the fibres. If, for example finely ground quartz or finely ground asbestos cement blende is added to the fibre-liquid mixture when dressing crude asbestos, a considerable saving of cement (about 10% of the quantity of cement required without these filling substances) is achieved. This has the effect on the one hand to lowering the cost of the finished products and on the other hand of considerably improving the elasticity of the finished products.

The idea of adding one or several admixture substances to the fibre-liquid mixture from the outset can be utilized with advantage also when adding pigments for colouring the fibre material. The fibre material alreay thoroughly dyed in the dressing process results in a very uniform colouring in the finished products.

When carrying out the method according to the invention apparatus of different kinds can be employed depending upon the kind of crude asbestos to be dressed. For opening up or breaking up crude asbestos with robust fibres between rigid working surfaces, a device comes into question, for example, in which in a conically housing with a rigid inner working surface a corresponding conical rigid working body with spiral protrusions on a mechanically driven shaft is so arranged that between the inner working surface of the housing and the surface of the conical working body there is a narrow passage gap in the shape of a hollow truncated cone.

By this arrangement a particularly favourable dressing of the fibre material is attained in that the fibre-liquid mixture in the passage gap, which is preferably made adjustable in width, is first fed with slow peripheral speed which then becomes gradually greater between the closely adjacent rigid working surfaces of the conical housing and the conical working body, thereby undergoing thorough vorticity so that the fibres are subjected to torsional effect.

A continuous bending to and fro and vigorous rubbing of the fibres against the rigid working surfaces can, however, also be attained with a particularly simple dressing apparatus which consists of a stationary pipe coil preferably arranged with a vertically upright longitudinal axis and which can be suitably adapted in length, radius and free passage cross-section, and which is connected up to the delivery side of a feed pump the speed of rotation of which is adjustable. The special advantages of such a dressing apparatus are its constructional simplicity, as it has no rotating driven parts, the reliable operation resulting therefrom and the low rate of mechanical wear. The upright arrangement of the pipe coil presents operation advantages as regards simple emptying and flushing out of the pipe coil.

For the gentle treatment of crude asbestos with delicate fibres between rigid working elements and elastically yieldable counter pressure elements, an apparatus is suitable in which a conical working body composed or having at least a surface layer of rubber or elastically compressible plastic substance is arranged on a shaft mechanically driven with variable speed of rotation and so mounted in a conical housing that its wall surface and the rigid inner working surface of the housing enclose a narrow passage gap in the shape of a hollow truncated cone.

At the same time a continuous to and fro bending and vigorous friction of the bundles of fibres and of the fibres gradually becoming loosened from the bundles of fibres, are attained in that the fibre-liquid mixture is fed through the passage gap of truncated conical shape between the rigid inner working surface of the conical housing and the elastically yieldable conical wall surface of the correspondingly conical working body with gradually increasing peripheral speed the further the fibre-liquid mixture approaches the end of the conical working body having the large base surface. The fibre-liquid mixture is thoroughly whirled during this feeding movement and as a result the fibre bundles and the individual fibres are repeatedly bent to and fro in different directions and at the same time a torsioning of the fibres is attained while carefully dressing the fibre material, which is extremely favourable for opening up the fibres.

An elastically compressible working body can with advantage be composed of a packet of annular disks of rubber or elastic material clamped on the shaft immediately in contact with each other. For working less sensitive fibres, however, an apparatus is also suitable in which the working body consists of a metal body or a metallic hollow body with a coating of rubber or elastically compressible synthetic material.

In order to increase the frictional effect, the inner working surface of the conical housing may be provided with depressions extending all round.

It is advantageous to coordinate to the conical working body a sleeve which is adjustable and fixable in the longitudinal direction of the shaft in order to vary the width of the passage gap. To enable the adjustment of the conical working body when the dressing apparatus is in operation, a hand-wheel may be screwed onto a screw-threaded section of the shaft outside the housing and, on being operated, moves the sleeve carrying the conical working body backwards and forwards on the shaft.

To ensure reliable working of the dressing apparatus it is advisable to coordinate with the conical working body fixed on the shiftable sleeve, a pressure spring which holds it in its operative position so that it can yield resiliently. If foreign bodies, such as unground clinker, pieces of asbestos blende, stones, pieces of iron or the like get into the passage gap with the fibre-liquid mixture, the conical working body will then yield and the passage gap be temporarily widened so that the foreign body can pass through the gap.

The devices for adjusting the width of the truncated conical passage and for the resilient yielding of the conical working body can with advantage be combined by the arrangement of two sleeves on the shaft, one of which sleeves carries the conical working body and the other sleeve is in operative connection with the hand adjusting wheel, whereby the last-mentioned sleeve has a flange serving as supporting surface for a pressure spring, which pushes forward the conical working body into operative position, and for guiding bolts fixed on a plate holding the conical working body and welded on the shiftable sleeve, said bolts being provided with abutment nuts on screw threads at their free ends.

In a preferred embodiment of the invention the end of the shaft carrying the shiftable sleeve with the conical working body is exposed and provided with a conical headpiece of hardened steel in the region of the point of the conical housing where the fibre-liquid mixture enters the passage gap. The exposed arrangement of the end of the shaft carrying the elastic working body contributes on the one hand, to trouble-free working of the dressing apparatus when foreign bodies accidentally get into the truncated conical passage gap and, on the other hand, facilitates the assembly and cleaning of the dressing apparatus. The conical steel headpiece keeps excessively large foreign bodies away from the passage gap and thus protects the dressing apparatus against damage without itself being liable to damage large foreign bodies.

If the crude asbestos material has to be treated particularly carefully in view of the delicacy of the individual fibres, it is advisable to employ an apparatus in which a shaft rotatably mounted inside a cylindrical housing and connected to an adjustable drive, is surrounded by an elastically yieldable lining, capable of being inflated with compressed air, and/or by a packet of annular disks, in which rigid annular disks with a bore diameter which is greater than the diameter of the shaft alternate with annular disks of elastically yieldable material, such as rubber, with a bore diameter which is equal or approximately equal to the diameter of the shaft; the apparatus is provided with regulating elements by which the pressure of the fibre-liquid mixture fed to one end of the housing and the pressure exerted by the elastically yieldable lining can be adapted to each other so that as the shaft rotates the fibre-liquid mixture is forced between the lining and the shaft with the necessary friction effect and the required bending intensity of the fibres. Another possibility of regulating can be attained by driving the shaft of the apparatus through the intermediary of variable speed gear.

In passing between the rotating shaft and the elastically yieldable lining the bundles of fibres are subjected to vigorous friction, adjustable in intensity, and at the same time the fibres are bent continuously to and fro, due to the fact that, on the one hand, the liquid pressure producing the feed movement and, on the other hand, a transverse force component act on the rotating shaft.

If the apparatus consists of two functional parts arranged one behind the other, the fibre bundles already partly loosened in the first functional part are subjected to repeated friction or rubbing owing to the fact that they are forced between the inner edge of the hole of each rubber disk and the shaft, whereby the fibres are bent, in that, on entering the annular chambers bordered by the bores of the rigid annular disks, the fibres turn upwards.

To make the repeated bending of the fibres necessary for opening up the fibres in a perfect manner, particularly intensive, the shaft can be provided with one or more helically wound flat ribs on the section clamped by the elastically yieldable counter pressure elements. The object of these ribs is not, however, to force the fibre-liquid mixture through the apparatus; the feeding movement is effected, as has already been mentioned, by the inflow pressure in every case. The helically wound ribs actually serve for bending the fibres into a second plane as they pass between the shaft and the elastically yieldable counter pressure elements.

Several apparatus suitable for carrying out the method of dressing raw asbestos according to the invention are illustrated by way of example in the accompanying drawing, in which:

The figure is a vertical longitudinal section through the apparatus with elastic working elements and a rigid counter pressure element.

The figure on the drawing shows an upright inverted funnel-shaped housing 31 with lateral brackets 33 is fixed on vertical rails 32 of a carrier frame and provided with depressions 31c extending round its conical inner surface. The upper end of the housing 31 is provided with a flange 34 and connected to a pipe conduit 12 through which the fibre-liquid mixture sucked by a feed pump out of a container is pressed from above in the direction of the arrow with adjustable pressure into the conical housing 31. At the other end having the greater diameter the conical housing 31 is connected by flanges 35 and 36 to a cylindrical housing 37 which forms a collecting chamber 38 for the fibre-liquid mixture fed through the dressing apparatus. The fibre-liquid mixture is led off from the collecting chamber 38 through a lateral connecting piece 39 of the housing 37 to a pipe conduit extending from the connecting piece 39, either already after it has passed only once through the dressing apparatus or, if the kind of fibre material to be dressed makes it necessary, after it has passed twice or several times through the dressing apparatus. For this purpose a two-way cock is fitted in the discharge conduit in the manner described in connection with the diagram shown in FIG. 4, and it is possible to adjust the plug of the cock so that the fibre-liquid mixture is either conducted to a place for further treatment or drying, or is returned into the circulation through the said container and the feed pump to again pass through the dressing apparatus.

The free or exposed upper end of a shaft 41 passes through a shiftable bearing sleeve 40 in a central aperture in the end wall of the housing part 37 into the two-part housing 37, 31. The shaft 41, driven by an electric motor through a variable speed gear, is rotatable in two axial pressure bearings 42 which are fixed by means of brackets 43 on the vertical rails 32 of a carrier frame. On the free end of the shaft 41 a sleeve 45 is slipped which is connected for rotation to the shaft 41 by means of a key 44 and longitudinally shiftable on this shaft. On the upper end of the sleeve 45 projecting upwards beyond the shaft 41 a conical working body 27' is fixed between two plates 46 and 47. This working body consists of a plurality of annular disks 27a of rubber or elastic synthetic substance, progressively larger in diameter, threaded on the upper end of the sleeve 45 and tightly clamped with their end faces bearing one against the other.

The plate 46 arranged in front of the small base of the conical body 27' is held and covered by a conical headpiece 50 of hardened steel. The headpiece 50 is provided with a screw pin 51 which is screwed into the screw threaded bore of a metal piece 52 which is welded on the front end of the metal sleeve 45 and closes the sleeve at its front end. The larger plate 47 is welded on the sleeve 45. By screwing the headpiece 50 more or less tightly, it is possible to impart to the packet of disks 27a the correct initial stress.

A plurality of bolts 53 extending parallel to the shaft 41 are fixed on the plate 47 and provided at their free ends with screw threads which extend through bores 55 in a flange 54 firmly welded on the shiftable bearing sleeve 40. A strong helical pressure spring 56, placed under initial stress between the plate 47 and the flange 54, tends to shift the sleeve 45 carrying the conical body 27 as far forward as abutment nuts 57 screwed on the screw-threaded ends of the bolts 53 and locked in a suitable manner, will allow.

The elastic conical working body 27' is as a rule yieldably held within the housing 31 coaxially thereto by means of the pressure spring 56 in such a position that between the rigid inner wall surface of the housing 31 and the elastic outer surface of the conical working body 27' there is a narrow cone-shaped passage gap 58. If foreign bodies for example larger pieces of asbestos blende or shale, stones, pieces of iron or the like, should enter the cone-shaped passage gap 58 with the fibre-liquid mixture, the conical working body 27' yields in that it is pushed back on the shaft with the sleeve 45, thereby compressing the helical spring 56, with the result that the passage gap 58 is widened temporarily to such an extent that the foreign bodies can pass therethrough.

To enable the width of the passage gap 58 to be adjusted to suit the kind of the fibre material to be treated, a handwheel 59 is provided which has a screw-threaded boss 60 which is screwed on to a screw-threaded section 41a in the middle of the shaft 41. A flat ring 61 is screwed on to the end face of a part of the handwheel boss 60 extending over the rear end portion of the sleeve 40 and the inner edge of this ring engages in an annular groove 62 formed in the periphery of the sleeve 40. By turning the handwheel 59 in one direction the sleeve 40 and the conical working body 27' connected thereto by the pressure spring 56 will be shifted nearer to the small base of the conical housing 31 so that the passage gap 58 becomes narrower, whereas by turning the handwheel 59 in the opposite direction the distance of the surface of the conical working body 27' from the inner wall of the conical housing 31 will be increased and the passage gap widened accordingly. The handwheel 59 is locked against unintentional turning when in its adjusted position by means of a counter nut 63.

A bellows 64 is fixed at one end to the plate 47 and at the other end to the flange 54 and prevents the fibre-liquid mixture entering the chamber 38 through the passage gap 58 from reaching the helical spring 56 and thus eliminates failures of the spring which might otherwise occur through fibre material or hard foreign bodies getting between the windings of the helical spring 56.

The dressing apparatus according to the invention can be employed not only for opening up crude asbestos but also for dressing or preparing other natural or synthetic fibre materials.

I claim:

1. Apparatus for dressing crude asbestos comprising a housing having an interior conical surface, a working body in said housing having a conical surface opposing said housing surface, means for journalling said working body for rotation in said housing, the conical surface of said working body being defined by a plurality of elastic members, said elastic members being confined between axially spaced end plates, means for biasingly urging said end plates toward each other, and means for axially adjusting said housing and said working body relative to each other whereby the width of a passage defined by said surfaces can be adjusted in size.

2. The apparatus as defined in claim 1 wherein said elastic members are annular in shape, said elastic members surround a sleeve, and means for rotating said sleeve whereby said working body is rotated relative to said housing.

3. The apparatus as defined in claim 1 wherein inlet means and outlet means are provided for introducing asbestos material into and withdrawing asbestos material from said passage respectively, and said working body has a metallic conical headpiece adjacent said inlet.

References Cited by the Examiner

UNITED STATES PATENTS

| | | | |
|---|---|---|---|
| 333,369 | 12/1885 | Wilkeson | 241—259 X |
| 1,301,637 | 4/1919 | Bair | 241—244 |
| 2,094,842 | 10/1937 | Hadsel | 241—274 |
| 2,173,975 | 9/1939 | Lyons | 241—256 X |
| 2,302,227 | 11/1942 | Kasser | 241—260 X |
| 2,653,770 | 9/1953 | Vicci | 241—245 X |
| 2,674,163 | 4/1954 | Prevost | 241—256 |
| 2,876,958 | 3/1959 | Edwards | 241—256 |
| 2,921,749 | 1/1960 | Brink | 241—260 |
| 2,954,938 | 10/1960 | Higer | 241—260 |
| 3,157,367 | 11/1964 | Rath | 241—274 |

ROBERT C. RIORDON, *Primary Examiner.*

D. KELLY, *Assistant Examiner.*